United States Patent

Burkhart et al.

[11] Patent Number: 5,079,270
[45] Date of Patent: Jan. 7, 1992

[54] METHOD FOR THE PREPARATION OF MOLDED POLYURETHANE AND POLYUREA ARTICLES

[75] Inventors: Georg Burkhart; Hans-Joachim Kollmeier, both of Essen; Helmut Lammerting, Herbede, all of Fed. Rep. of Germany

[73] Assignee: Th. Goldschmidt AG

[21] Appl. No.: 425,810

[22] Filed: Oct. 23, 1989

[30] Foreign Application Priority Data

Nov. 3, 1988 [DE] Fed. Rep. of Germany ....... 3837351

[51] Int. Cl.⁵ .............................................. C08G 18/14
[52] U.S. Cl. .................... 521/117; 521/115; 521/124; 521/128; 524/589; 524/715
[58] Field of Search ............... 428/316.6, 318.6, 319.3, 428/423.3; 521/117, 122, 128, 137, 115, 117, 124, 128; 528/61; 525/194; 524/715, 589

[56] References Cited

U.S. PATENT DOCUMENTS

| | | | |
|---|---|---|---|
| 4,251,638 | 2/1981 | Reischl | 521/128 |
| 4,254,228 | 3/1981 | Kleimann | 521/128 |
| 4,293,456 | 10/1981 | Reischl | 524/589 |
| 4,721,754 | 1/1988 | Baghdadchi | 528/61 |
| 4,797,320 | 1/1989 | Kopp et al. | 428/316.6 |
| 4,868,224 | 9/1989 | Harasin et al. | 521/124 |
| 4,886,838 | 12/1989 | Dewhurst | 521/117 |
| 4,897,428 | 1/1990 | Denhurst et al. | 521/115 |
| 5,002,999 | 3/1991 | Lowery et al. | 521/715 |

FOREIGN PATENT DOCUMENTS 2543638 11/1976 Fed. Rep. of Germany.

Primary Examiner—John Kight, III
Assistant Examiner—Duc Truong
Attorney, Agent, or Firm—Toren, McGeady & Associates

[57] ABSTRACT

A method and composition are disclosed for the preparation of polyurethane and polyurea molded articles, particularly according to the RIM method, in which liquid polybutadiene with an average molecular weight of 1,500 to 6,000 is used as an internal release agent in an amount of 0.5 to 5% by weight, based on the reaction formulation. The release agent is highly effective and demolded products which contain this release agent can be painted over without formation of surface defects.

21 Claims, No Drawings

METHOD FOR THE PREPARATION OF MOLDED POLYURETHANE AND POLYUREA ARTICLES

BACKGROUND OF INVENTION

The invention is directed to a method and composition for the preparation of molded polyurethane and/or polyurea articles. More particularly, this invention concerns a method and composition for the preparation of molded polyurethane and/or polyurea articles, which may optionally have a cellular core, by the reaction of at least one polyol or one polyamine with an organic di- or polyisocyanate in the presence of a catalyst, release agent and optionally conventional additives such as cross linking agents, chain extenders, blowing agents, stabilizers, cell regulators, pigments and fillers.

Molded polyurethane articles or molded polyurethane foams are obtained by the reaction of at least one polyol (polyether or polyester polyol) with an organic di- or polyisocyanate. The corresponding molded polyurea articles are obtained by the reaction of a polyamine, such as a polyoxypropylenediamine, with an organic di- or polyisocyanate. Molded articles which contain urethane as well as urea groups, can be produced in a known manner according to the state of the art by reacting polyols with organic di- or polyisocyanates in the presence of amine cross linking agents.

Articles of molded polyurethane or polyurea are used on a large scale as car body parts such as skirt, spoiler, fenders or for the manufacture of seats for the automobile industry. Because of their toughness and wear resistance, polyurethane and polyurea polymers can also be used for the manufacture of shoe soles, heels and similar products.

Curing of polyurethane and polyurea products frequently takes place simultaneously with molding in closed heated molds. Such procedures, particularly the reaction injection molding method, which is also referred to as the RIM method, have gained special importance.

An appreciable problem occurs from the fact that molded polyurethane articles tend to adhere to the inner wall of the mold. A large number of release agents are known to those skilled in the art of manufacturing molded articles from reactive compositions which may be applied on the inner walls of the molds or added as internal release agents to the reaction formulation. Internal release agent, which generally belong to different classes of substances from those applied to molds, include for example, metal soaps, such as zinc stearate, esters of higher fatty acids, natural or synthetic oils, waxes and silicones.

Especially preferred internal release agents are those which make any special preparation of the molds superfluous, do not affect the properties of the reacted, molded synthetic material and, as far as possible, cause no change of the surface properties of the molded articles, such as an adverse effect on paintability. The internal release agents must be readily dispersible in the reaction formulation; but to be effective, they must also accumulate at the surface of the molded article.

Examples of internal release agents which are used particularly for the production of molded polyurethane or polyurea articles by the RIM method are organosilicon block copolymers which, aside from siloxane blocks, have polyoxyalkylene blocks. In this connection, the structure of the compounds evidently plays an essential role in the release behavior.

For example, it may be inferred from the German Offenlegungsschrift 2,543,638 that compounds of the formula

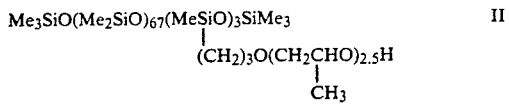

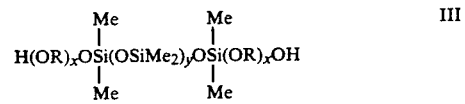

are inferior to compounds of the formula

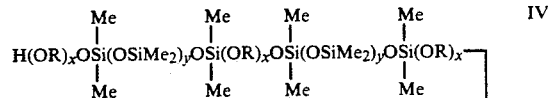

and/or

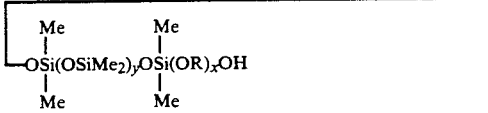

In formulas III and IV, subscript x in each case has an average value of 3 to 45, subscript y an average value of 8 to 198, Me represents methyl and the $(-OR)_x$ group represents a polyoxyalkylene polymer or a polyoxyalkylene copolymer, wherein R is composed of ethylene groups or butylene groups or mixtures of ethylene or butylene groups with propylene groups, the ratio of the amount of ethylene or butylene groups to the amount of propylene groups being selected so that the ratio of the carbon atoms to the oxygen atoms in the whole of the $(-OR-)$ block is 2.0:1 to 2.9:1.

Test methods for determining and comparing the release properties of different release agents can also be taken from this Offenlegungsschrift.

The internal release agents on the market are not satisfactory in all respects and it would be desirable if the release properties were to be improved further.

An additional disadvantage of known internal release agents is that, in the manufacture of the molded polyurethane articles with a cellular core, they hinder the development or retention of the cellular structure and, in the limiting case, cause foam that is formed to collapse. However, the development of a cellular structure in the interior of the molded article is important in order to obtain molded articles which have a satisfactory surface, as well as satisfactory mechanical properties.

Some manufacturers desire release agents which are free of SiOSi bonds, since there is concern about possible interference with the later processing of the molded article, for example, when painting. It is therefore desirable to make highly effective silicon-free release agents available to manufacturers.

SUMMARY OF THE INVENTION

It is an object of the invention to provide internal release agents for the manufacture of molded polyurethane and/or polyurea articles, especially by the RIM method, which are superior to the known internal release agents with respect to their release properties and which fulfill the initially indicated requirements as optimally as possible.

It is also an object of the invention to provide internal release agents which do not prevent or interfere with the development or retention of the cellular structure in the manufacture of molded polyurethane and/or polyurea articles with a cellular core.

Surprisingly, it has been discovered that molded polyurethane and polyurea articles, including those with a cellular core, with an outstanding release effect are obtained by preparing the polyurethane and polyurea articles with liquid polybutadiene having an average molecular weight of 1,500 to 6,000 as the internal release agent, in an amount of 0.5 to 5% by weight, based on the formulation of the reaction to prepare the polyurethane or polyurea.

DESCRIPTION OF THE INVENTION

Preferably, according to the invention, polybutadiene with an average molecular weight of 2,000 to 4,000 is used as the internal release agent. Further, polybutadiene which has an average molecular weight of about 3,000 and a composition of about 75% 1,4-cis-double bonds, about 24% 1,4-trans-double bonds and about 1% vinyl double bonds has proven to be particularly useful as a release agent for the aforementioned method.

It is also possible to use a polybutadiene, which has OH groups as the release agent. The OH number of such a hydroxy-functional liquid can be $\leq 40$. In this case the polybutadiene is incorporated into the resulting molded polyurethane or polyurea article. However, the release effect is generally reduced by such hydroxyl groups.

Polybutadiene is preferably added to the polyol or polyamine component and it can be dispersed in the polyol or polyamine by stirring. Dispersal of the polybutadiene in the polyol or polyamine can be improved further by the simultaneous addition of a nonionic emulsifier. For this purpose, it is advisable to mix the emulsifier with the polybutadiene and to add the mixture to the polyol or polyamine component.

As nonionic emulsifiers, products of the addition reaction between ethylene oxide and fatty alcohols or alcohols of the oxo synthesis are suitable. In particular, products of the addition reaction between 4 to 25 moles of ethylene oxide and a fatty alcohol, such as lauryl alcohol, oleyl alcohol or stearyl alcohol are suitable. The ethylene oxide or propylene oxide may be reacted randomly or in blocks in the addition reaction.

Polybutadiene is included in the reaction mixture in an amount of 0.5 to 5% by weight, based on the reaction formulation. Preferably, it is used in an amount of 1.5 to 2.5% by weight.

According to the invention, polybutadiene facilitates the demolding process appreciably. In conjunction with external release agents, the number of demolding cycles is increased appreciably and is comparable with the number attainable with liquid silicones and it has been found that the release agent does not have a harmful effect on foam formation. The absence of an effect on foam formation is surprising to those skilled in the art, since a defoaming action due to the presence of polybutadiene, which is a hydrophobic oil in the molecular weight range used, would have been expected. In addition, demolded parts exhibit excellent overpainting properties.

The following examples, which illustrate the preparation of molded polyurethane articles of the invention, set forth the best mode currently contemplated for carrying out the invention and must not be interpreted as limiting the invention in any manner. The effectiveness of the release agents of the invention is compared with comparative examples which include known, state of the art, release agents. For this purpose, release and air loading experiments were carried out by laboratory test methods.

The following compounds were used for the illustrative and comparative examples:

RELEASE AGENTS OF THE INVENTION

Compound A = liquid polybutadiene, MW 1,800
Compound B = liquid polybutadiene, MW 3,000
Compound C = liquid polybutadiene, MW 6,000

COMPARISON RELEASE AGENTS

Compound D = zinc stearate
Compound E: according to U.S. Pat. No. 4,076,695
Compound F: according to OLS 2,543,638

A: RELEASE TESTS

EXAMPLE 1

For this purpose, a typical RIM formulation is prepared with a hand mixer. The mixture is added to a test mold, in which it is allowed to react. Internal, state of the art release agents and release agents that used according to the invention are added to otherwise identical formulations and under identical process conditions. In addition, a foaming test is carried out without the addition of a release agent.

Procedure

Polyether polyol (80 parts by weight), with an OH number of 27, which was synthesized by the addition reaction of trimethylolpropane first with propylene oxide and subsequently with ethylene oxide, is mixed with 28.0 parts by weight of ethylene glycol, 0.35 parts by weight of triethylenediamine, 0.02 parts by weight of tin dibutyl dilaurate and 5.0 parts by weight of an inventive release agent, a liquid polybutadiene.

As isocyanate, a product is used, which is obtained by the reaction of 4,4-diisocyanatodiphenylmethane with tripropylene glycol and has an NCO content of 23% (isocyanate component). In each case, 100.0 parts by weight of the polyol component are mixed with 127.0 parts by weight of the isocyanate component by intensive stirring for 7 seconds at 2,500 r.p.m. with a laboratory stirrer. The reaction mixture, which is still liquid, is poured into an aluminum mold, which can be closed off and which is maintained at a temperature of 70° C. A separate lid, which is fastened with wing nuts, is used to close off the mold. The inner surfaces of the mold and the inside of the lid used to close off the mold are provided with a release agent before the reaction composition is poured in. For this purpose, the release agent is applied very thinly with a rag and polished. After a period of 4 minutes, the lid is removed from the mold. The tensile force required to remove the lid is measured with a spring balance. If no internal release agent is used, the reaction material adheres to the lid, so that when the lid is removed forcibly, the surface of the injection molding is damaged and parts of the reaction material adhere to the inside of the lid. When an internal release agent is used, the removal of the lid of the mold is facilitated substantially and damage to the surface of the injection molding is avoided. The results of the comparison Examples are listed in following Table 1.

When the comparison release agent D is tested (zinc stearate), it is previously dispersed in the polyether polyol used so as to form a 20% dispersion. Thereupon the testing procedure is identical with that employed to test the inventive release agents. Comparison release agent E is tested in the same way as the inventive release agents. The amount of release agent added in each case is 1.76% by weight, based on the reaction formulation.

TABLE 1

| Product | Release Force (N/100 cm.$^2$) |
|---|---|
| Blank Example without additive of the invention: | 40 |
| Compound A | 10 |
| Compound B | 12 |
| not of the invention: | |
| Compound D | 30 |
| Compound E | 24 |

The release forces measured confirm the high effectiveness of the release agents used according to the invention.

EXAMPLE 2

In this example, a typical integral foam formulation, which contains monofluorotrichloromethane as a blowing agent, was prepared with a hand mixer. Here also, the mixture is added to a test mold, in which it is allowed to react. In otherwise identical formulations and under identical conditions, state of the art internal release agents and release agents of the invention are added. In addition, a foaming test is carried out without the addition of a release agent.

Procedure

Polyether polyol (100.0 parts by weight) with an OH number of 27, which was prepared by the addition reaction of trimethylolpropane first with propylene oxide and then with ethylene oxide, is mixed with 9.0 parts by weight of 1,4-butanediol, 0.65 parts by weight of triethylenediamine, 1.75 parts by weight of triethanolamine, 5.0 parts by weight of monofluorotrichloromethane as blowing agent and 4.0 parts by weight of the inventive release agent.

As isocyanate, a product is used, which is obtained by the reaction of 4,4-diisocyanatodiphenylmethane with tripropylene glycol, and which has an NCO content of 23% (isocyanate component). In each case, 100.0 parts by weight of the polyol component are mixed with 54.0 parts by weight of the isocyanate component by intensive stirring for 7 seconds at 2,500 r.p.m. with a laboratory stirrer. The reaction mixture, which is still liquid, is poured into an aluminum mold, which can be closed off and is maintained at a temperature of 45° C. The further procedure is identical with that given for Example 1.

If no internal release agent is used, the reaction material adheres to the lid, so that when the lid is removed forcibly, the surface of the injection molding is damaged and parts of the reaction material adhere to the inside of the lid. When an internal release agent is used, the removal of the lid of the mold is facilitated substantially and damage to the surface of the injection molding is avoided. The results of comparison Examples are listed in the following Table 2.

Compounds B and C, which are named in the specification, are used as the polymers effective as release agents according to the invention. Compounds D (zinc stearate) and F are used in accordance with German Offenlegungsschrift 2,543,638 as products of the state of the art. For testing compound D, a 20% dispersion of the zinc stearate in the foaming polyether employed is used, as described in Example 1. Compound F is used in the same way as the inventive release agent.

The amount of release agent added in each case is 2.35% by weight, based on the reaction formulation.

TABLE 2

| Product | Release Force (N/100 cm.$^2$) |
|---|---|
| Blank Example without additive of the invention: | 55 |
| Compound B | 24 |
| Compound C | 29 |
| not of the invention: | |
| Compound D | 47 |
| Compound F | 25* |

*strong coarsening of cells identifiable

The release forces measured confirm the high effectiveness of the release agents used according to the invention. Compound F also has a good release action; however, it proves to be an active defoamer, so that the molded article has a much coarsened cell structure with partial collapse zones and thus becomes useless.

EXAMPLE 3

In this example, a typical RIM formulation with an amine cross linking agent was prepared by the method of Example 1. The mixture is added to a test mold, in which it is allowed to react. In otherwise identical formulations and under identical process conditions, state of the art internal release agents and release agents used according to the invention are added. In addition, a foaming test without the addition of a release agent is carried out.

Procedure

A polyether polyol (100.0 parts by weight) with an OH number of 27, which was prepared by the addition reaction of trimethylolpropane first with propylene oxide and then with ethylene oxide, is mixed with 21.0 parts by weight of diethyltoluenediamine (DETDA) and 3.0 parts by weight of the inventive release agent. The isocyanate is obtained by the reaction of 4,4-diisocyanatodiphenylmethane with tripropylene glycol and has an NCO content of 23% (isocyanate component). In each case, 100.0 parts by weight of the polyol component are mixed with 52.0 parts by weight of the isocyanate component by intensive stirring for about 5 seconds at 3,500 r.p.m. with a laboratory stirrer. The reaction mixture, which is still liquid, is poured into an aluminum mold, which can be closed off and is maintained at a temperature of 70° C. The further procedure is identical with that given for Example 1. If no internal release agent is used, the reaction material adheres to the lid, so that, when the lid is removed forcibly, the surface of the injection molding is damaged and parts of the reaction material adhere to the inside of the lid. When an internal release agent is used, the removal of the lid of the mold is facilitated substantially and damage to the surface of the injection molding is avoided. The results of comparison Examples are listed in following Table 3. Compounds A and B, which are named in the specification, are used as polymers effective as release agents according to the invention. Compounds E and F are state of the art compounds. The comparison compounds are tested in the same way as the inventive release agents. The amount of release agent added in each case is 1.59% based on the reaction formulation.

TABLE 3

| Product | Release Force (N/100 cm.$^2$) |
|---|---|
| Blank Example without additive of the invention: | 30 |
| Compound A | 7 |
| Compound B | 8 |
| not of the invention: | |
| Compound E | 10* |
| Compound F | 9* |

*prevents the formation of foam

The release forces measured confirm the high effectiveness of the release agents used according to the invention. Admittedly, the comparison release agents of the Compounds E and F have a good release effect; however, they prevent the formation of foam when air is admixed in the recirculation systems of RIM installations.

B: AIR LOADING TESTS

In a separate test, the air-loading capacity of polyol components after the addition of the inventive release agent is measured and compared with known products of the state of the art. To carry out the test, 88.0 parts by weight of the previously used polyether polyol of Example 1 are mixed with 28.0 parts by weight of ethylene glycol, 0.35 parts by weight of triethylenediamine, 0.02 parts by weight of tin dibutyl dilaurate and, in each case, 3 parts by weight of the compound of the inventive release agent A to C. The procedure is repeated in the same manner with comparison release agents E and F. To test the comparison release agent D (zinc stearate), a 20% dispersion in the polyether polyol, similar to that described before is used, the rest of the method being the same.

The mixture is stirred intensively for 4 minutes at 2,300 r.p.m. in order to beat in as much air as possible. After that, 70 g. are weighed into a measuring cylinder. Immediately after the release agent is added to the cylinder, the level of this liquid/air mixture is measured. The results of the air loading test are given in Table 4.

TABLE 4

| Product | Level in ml. |
|---|---|
| Blank Example without additive of the invention: | 77.0 |
| Compound A | 77.5 |
| Compound B | 77.0 |
| Compound C | 77.5 |
| not of the invention: | |
| Compound D | 84.0 |
| Compound E | 72.0* |
| Compound F | 72.0* |

*no air bubbles identifiable

The results show that the release agents used according to the invention are capable of making air loading possible. Comparison compounds E and F prevent the formation of a stable air/polyol mixture. Admittedly, zinc stearate (Comparison Compound D) makes air loading possible; however, its release effect is substantially less than that of release agents used according to the invention.

The inventive method, therefore, provides a considerable reduction in demolding forces, while retaining the foam structure. Retention of the foam structure and the possibility of air loading in recirculation cycles in RIM installations are desired in order to improve appreciably, the quality of the molded article. In systems in which physical or chemical blowing agents are used as well, the retention of the foam structure is absolutely necessary to achieve good use properties.

We claim:

1. A method for the preparation of polyurethane and polyurea articles which may optionally have a cellular core, wherein at least one polyol or at least one polyamine is reacted with an organic diisocyanate or polyisocyanate in the presence of a catalyst and an internal release agent, comprising using liquid polybutadiene having an average molecular weight of 1,500 to 6,000 in an amount of 0.5 to 5% by weight, based on the total weight of the components of the reaction, as the internal release agent.

2. The method of claim 1, in which the polybutadiene has an average molecular weight of 2,000 to 4,000.

3. The method of claim 1, in which the polybutadiene is added to the polyol or the polyamine.

4. The method of claim 1, in which the polybutadiene is added to the polyol or polyamine in a mixture comprised of 90 to 95% by weight of polybutadiene and 5 to 10% by weight of a nonionic emulsifier.

5. The method of claim 1, in which the reaction of the polyol or the polyamine is carried out in the present of at least one optional additive selected from a member of the group consisting of cross linking agent, chain extender, blowing agent, stabilizer, cell regulator, pigment and filler.

6. In a composition for the preparation of a polyurethane or polyurea molded article which may optionally have a cellular core, wherein the composition is comprised of at least one polyol or at least one polyamine, an organic diisocyanate or polyisocyanate, a catalyst and an internal release agent, the improvement wherein liquid polybutadiene containing no hydroxyl groups and having an average molecular weight of 1,500 to 6,000 in an amount of 0.5 to 5% by weight, based on the total weight of the composition, is present in said composition as the internal release agent.

7. The composition of claim 6, in which the polybutadiene has an average molecular weight of 2,000 to 4,000.

8. The composition of claim 1, in which a mixture comprised of 90 to 95% by weight of polybutadiene and 5 to 10% by weight of a nonionic emulsifier is present in the composition.

9. The composition of claim 1, in which at least one optional additive selected from a member of the group consisting of cross linking agent, chain extender, blowing agent, stabilizer, cell regulator, pigment and filler is present in the composition.

10. A method for improving the release of polyurethane and polyurea articles, which may optionally have a cellular core, from the molds in which the articles are manufactured, wherein the articles are prepared by reacting at least one polyol or at least one polyamine with an organic diisocyanate or polyisocyanate in the presence of a catalyst and an internal release agent, comprising carrying out the reaction of the polyol or the polyamine in the presence of polybutadiene having an average molecular weight of 1,500 to 6,000 in an amount of 0.5 to 5% by weight, based on the total weight of the components of the reaction, as the internal release agent.

11. The method of claim 10, in which the polybutadiene has an average molecular weight of 2,000 to 4,000.

12. The method of claim 10, in which the polybutadiene is added to the polyol or the polyamine.

13. The method of claim 10, in which the polybutadiene is added to the polyol or polyamine in a mixture comprised of 90 to 95% by weight of polybutadiene and 5 to 10% by weight of a nonionic emulsifier.

14. The method of claim 10, in which the reaction of the polyol or the polyamine is carried out in the present of at least one optional additive selected from a member of the group consisting of cross linking agent, chain extender, blowing agent, stabilizer, cell regulator, pigment and filler.

15. The molded polyurethane or polyurea article prepared according to claim 1.

16. The molded polyurethane or polyurea article prepared according to claim 2.

17. The molded polyurethane or polyurea article prepared according to claim 3.

18. The molded polyurethane or polyurea article prepared according to claim 4.

19. The molded polyurethane or polyurea article prepared according to claim 5.

20. The method of claim 1 in which the polybutadiene contains no hydroxyl groups.

21. The method of claim 10 in which the polybutadiene contains no hydroxyl groups.

* * * * *